Sept. 26, 1967 P. D. DODD ET AL 3,344,231
DIGITAL FACSIMILE SYSTEM EMPLOYING RUN-LENGTH ENCODING AND VARIABLE SCAN RATE TO PROVIDE REDUCED BANDWIDTH
Filed Dec. 10, 1964
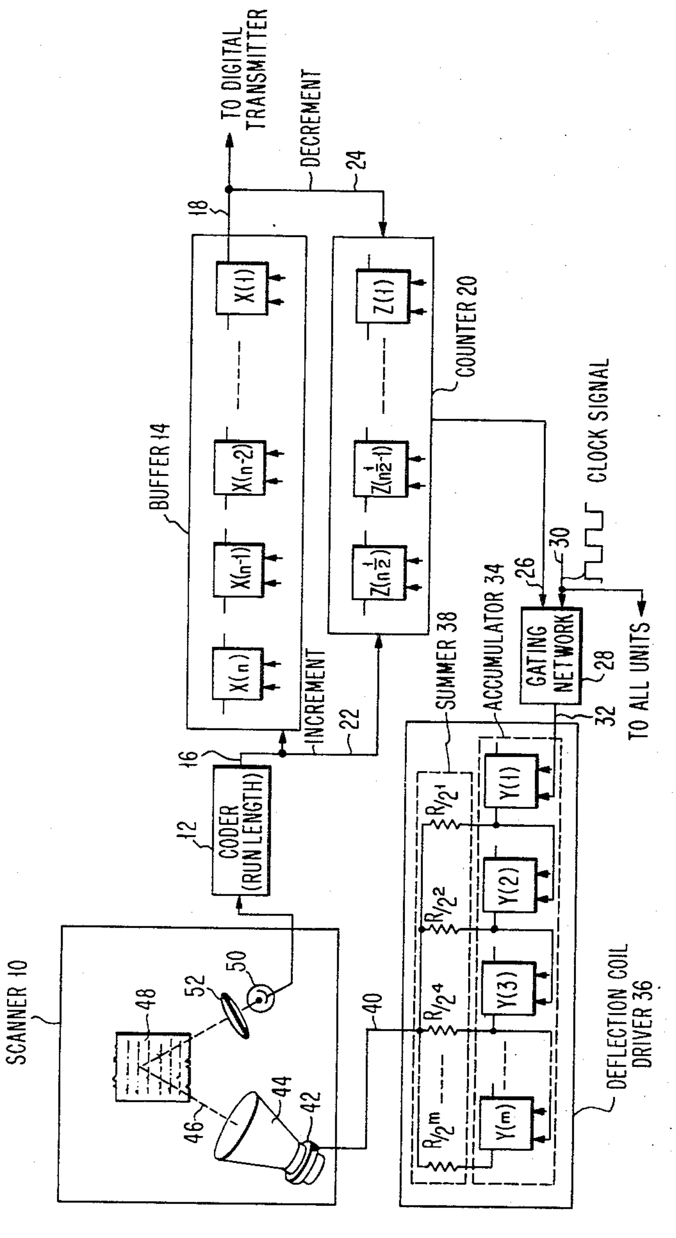
INVENTORS
PAUL DAVID DODD
G. FRED GROMETER
BY
Arthur Decker
ATTORNEY United States Patent Office 3,344,231
Patented Sept. 26, 1967

3,344,231

DIGITAL FACSIMILE SYSTEM EMPLOYING RUN-LENGTH ENCODING AND VARIABLE SCAN RATE TO PROVIDE REDUCED BANDWIDTH

Paul David Dodd and George Fred Grometer, San Jose, Calif., assignors to International Business Machines Corporation, Armonk, N.Y., a corporation of New York Filed Dec. 10, 1964, Ser. No. 417,293
10 Claims. (Cl. 178—7.1)

This invention relates to facsimile transmission systems and, more particularly, to digitally encoded run length transmission of pictorial information.

In conventional facsimile transmission, there is generated a voltage which varies in amplitude corresponding to the blackness of sequentially scanned elemental areas of a picture. This voltage is transmitted to the receiver where it is used to reassemble a facsimile of the original picture. Scanning may be accomplished with a spot of visible light, an electron beam, or other finely focused sensor, which sweeps over the picture, usually in spaced lines, at a fixed rate. Sequential elemental areas of constant darkness result in the transmission of a voltage of constant amplitude, and the time spent transmitting such voltage is largely wasted. Run length coding is a method designed to achieve reduced time digital facsimile transmission in which the number of elemental areas and the darkness is quantized, the former as a count and the latter as a binary. Further the binary value of the latter need not be transmitted at all, since each transmission of the area count may be understood in the receiver as involving a darkness change, which, of course can be to only the opposite binary value. The time required for transmitting a picture utilizing this technique is variable, being less for simpler pictures (fewer variations between black and white) than for more complicated ones. Successive scans are transmitted in digital form as codes corresponding to the lengths between shade changes (run length) rather than as individual area elements. However, it is preferable to utilize continuously the maximum bit rate capability of the transmission line, and since the times required for particular runs depend on the lengths of the runs, a practical run length coding facsimile system must involve either a variable speed scan, a high capacity buffer storage or both.

In the system, then, the picture may be scanned at a constant rate, coded as a count of the run length, and the code deposited asynchronously in the buffer. After the picture has been completely scanned, the buffer may be emptied at a constant bit rate into the transmission channel. This scheme could require a rapid access buffer of extraordinary size, conceivably of a million bits if pictures which include many black and white alterations are to be handled.

Another approach is that involving discontinuous scanning. A low inertia scanning device, such as a flying spot scanner, could be made to sweep over the copy in a rectangular scanning raster at a very high speed. The coded output is transmitted directly. Each time the encoder saturated, the spot would be made to stop and wait for desaturation to occur, or, in the alternative, the spot is halted at each elemental area and waits. Such a scheme would present many practical difficulties in the simultaneous provision of very high scanning acceleration and positional accuracy.

The system of this invention also utilizes a cathode ray tube scanner feeding a run length encoder which provides input to a buffer register, the output of which comprises the signal for a digital transmitter. A counter having a maximum count capability equal to the storage capacity of the buffer, cooperates with the buffer such that, for each entry into the latter, a unit increment is made in the former, and, also, for each emission from the latter, a unit decrement is made in the former. The increments and decrements occur with regard to a prescribed count, preferably the median count of the counter, which coincides with the half full condition of the buffer. A gate at the counter output is enabled by counts other than the median to pass clock pulses to the deflection coil driving circuit of the cathode ray tube in the scanner. The number of clock pulses passed determines the deflection extent at which the driving circuit sets the CRT beam. As a result of this arrangement, whenever the present content of the buffer departs from median capacity, the count of the counter will so indicate and inactivate the cathode ray tube driver circuit if the departure results from entry of information by the scanner or activate the cathode ray tube driver circuit if the departure results from receipt of information by the transmitter. The rate at which information is generated by the scanner is thus controlled by the fullness of storage of the buffer.

From the above, it is seen that it is an object of this invention to provide an efficient run length, digitally encoded, facsimile transmission system.

It is another object of the invention to provide a system for synchronizing a source and a utilization device for digital signals without involving exceptional large capacity intermediate storage or complex timing relationships among the equipments used or precise positioning of (beam or spot) scanning devices.

The foregoing and other objects, features and advantages of the invention will be apparent from the following more particular description of a preferred embodiment of the invention, as illustrated in the accompanying drawing.

The figure is a block diagram of a preferred embodiment of the invention.

Referring thereto, the combination of scanner 10 and coder 12 may be considered a source of digital signals serially presented on line 16 to buffer 14, which signals pass through buffer 14 to a facsimile digital transmitter or some other utilization device on line 18.

Scanner 10 is preferably of the photoelectric type in which electron beam 46 or a spot of light traverses the copy, document 48, in repetitive horizontal lines, producing a reflected beam focused by lens 52 on photoelectric cell 50, the output of which comprises a bilevel pulse train corresponding to the dark or light appearance of the scanned elemental areas of document 48. Typical devices of this nature, easily adaptable to the present system, are found in Patents 2,958,851 and 2,897,481 and in the publication "Reduced-Time Facsimile Transmission by Digital Coding" by Wyle, Erb and Banow, IRE Transactions on Communications Systems, September 1961, page 215.

Presuming that document 48 contains typewritten horizontal lines of print, in this system each line is scanned discontinuously by sweeps of different velocity of beam 46; the maximum number of sweeps corresponds to the maximum number of alternating black and white elemental areas established by the desired resolution. If 128 elemental areas per line are called for, 127 sweeps are involved and line 40 from deflection coil driver 36 must have available 127 different voltages with which to excite deflection coil 42 of cathode ray tube 44. These voltages are obtained from summer 38 as will be explained.

Returning now to coder 12, this unit provides a count output, on line 16, representing the number of sequential elemental areas of the same binary value scanned by a sweep, i.e., for a sweep, the number of elemental areas between changes of darkness in a line on document 48.

Thus, if the scanned line is all one shade, one sweep would be involved, and the count generated by coder 12, after completion of the sweep, would be 128. However, if the line is of a checker board pattern, a count of 1 would be generated for 128 sequential sweeps. Thus, coder 12 comprises a counter of the system clock signal pulses synchronized by the start and stop of the sweep, the count being a 7-bit serial code on lines 16 and 22. This type of coder is suitable for present purposes, although it is recognized that the most efficient code is one of variable word lengths corresponding to the logarithms of the inverse probabilities of the respective run lengths.

Buffer 14 comprises a plurality of stages X(1) through X($n$), $n$ being chosen such that storage is suitable for a number of run length codes corresponding to the code generation rate of scanner 10 and coder 12, the constraint being that buffer 14 never be either empty or full; specifically, the storage capacity of buffer 14 is coordinated with the repetition rate of code generation such that it "hunts" at half capacity. Thus, if 4 run length codes are appropriate, buffer 14 would comprise 28 stages X1 through X28, stages X1 through X14 being set up with two codes, stages X15 through X21 being ready to receive the next code and stages X22 through X28 being held in reserve in the event that 2 codes are generated before scanning may be slowed down. The median fill of buffer 14 is thus bits in stages X1 through X14 and reset of stages X15 through X28 and this is the condition for which counter 20 is set at its median count.

Counter 20 is connected across buffer 14 such that a unit increment in counter 20 occurs each time a code is received by it on line 22 (emitted by coder 12), whereas a unit decrement occurs each time a code is received by it on line 24 (emitted by buffer 14). The count sequence for counter 20 is as follows:

| Stage | | | | |
|---|---|---|---|---|
| Z4 | Z3 | Z2 | Z1 | |
| 0 | 0 | 0 | 0 | ↑ |
| 0 | 0 | 0 | 1 | |
| 0 | 0 | 1 | 0 | |
| 0 | 0 | 1 | 1 | |
| 0 | 1 | 0 | 0 | |
| 0 | 1 | 0 | 1 | bit on line 24 |
| 0 | 1 | 1 | 0 | |
| 0 | 1 | 1 | 1 | |
| 1 | 0 | 0 | 0 | median |
| 1 | 0 | 0 | 1 | |
| 1 | 0 | 1 | 0 | bit on line 22 |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | ↓ |

The publication "A Counter Controlled Digital Averaging Buffer" by Dodd and Provazek, IBM Technical Disclosure Bulletin. June 1964, page 41, may be referred to for a disclosure of a buffer-counter combination admirably suited for the purpose served by buffer 14 and counter 20.

The count in counter 20 controls gating network 28, through connection of one input thereto, line 26, to stage Z4, which, when false, passes the other input, comprising the system square wave clock signal, on line 30, from a source (not shown). The output of gating network 28 provides, on line 32, the input to accumulator 34 in deflection coil driver 36.

Accumulator 34 comprises a plurality of stages Y(1) through Y($m$) loaded by summer 38, a network of resistors, one corresponding to each stage of accumulator 34 and valued in the respective ratios 1:2:4:8 . . . . The showing of FIGURE 1 of Patent 2,897,363 includes an accumulator and summer substantially as would be employed by the present system.

The output of summer 38, on line 40 connects to deflection coil 42 of cathode ray tube 44 of scanner 10. In scanner 10, the change in position of electron beam 46 with regard to incidence on document 48 depends on the amount of change of potential of line 40 and, together with the content of document 48, determines the signal generated by photocell 50 through lens 52.

The number of clock signal pulses passed by gating network 28 determines the extent of deviation of the state of accumulator 34 from its prior state, which, in turn, through summer 38, controls the deviation of the driving voltage to deflection coil 42, and thereby, the sweep extent of beam 46. This is an effect of a change in the run length code repetition rate generation by coder 12, which tends to increase storage in buffer 14 and effectuates a deviation in the state of counter 20 from its median count. In summary, a beam sweep velocity which causes buffer 14 to store more than half its capacity for codes is sensed by counter 20 and fed back through gating network 28 and deflection coil driver 36 to deflection coil 42 as a control voltage to slow the sweep. Thus, scanner 10 and coder 12 are synchronized to the code rate of the digital transmitter although their generation of codes is without start-stop operation and is not repetitive.

The above description and accompanying drawings is considered sufficient to teach the present invention and permit one skilled in this art to practice it without undue difficulty. However, it may be pointed out that the technology involved is available in the literature. Thus, where "stages" of various equipments are called for, these may be any of the flip-flops divulged in the book The Logical Design of Digital Computers by Montgomery Phister, Jr., John Wiley, Inc., New York 1963, connected serially (i.e., as a shift register) or in parallel so that all bits of a code are operated on simultaneously.

Briefly, while the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a facsimile system including a digital transmitter, the combination comprising:

a scanner capable of emitting binary data corresponding to scansions of a document;

a coder responsive to the output from said scanner and capable of emitting codes corresponding to scansions or portions thereof;

a buffer register for storing a plurality of codes from said coder;

means to connect said buffer register to the digital transmitter;

a counter capable of reversing its count sequence for each code entering or exiting from said buffer register;

a circuit having an output signal correlated to a particular count of said counter; and means to connect the signal from said circuit as control for said scanner.

2. The system of claim 1 in which the output signal from said circuit is correlated to the median count of said counter.

3. The system of claim 1 in which all said components are synchronized by a clock signal.

4. The system of claim 3 and a gating network responsive to the counts from said counter other than the median count to pass the clock signal to said circuit.

5. The system of claim 1 in which said coder and scanner operate to generate codes representing run lengths of scansions of the document.

6. The system of claim 1 in which said scanner comprises an electron beam device directed at the document and a beam responsive device for receiving the beam modulated by information recorded on the document, to generate binary data signals corresponding thereto.

7. The system of claim 6 wherein the control for said electron beam device connects to the deflection coil thereof.

8. In a facsimile system including a digital transmitter, the combination comprising:

a scanner capable of emitting binary data corresponding to scansions of a document;

a coder responsive to the output from said scanner and capable of emitting codes corresponding to scansions or portions thereof;

a buffer register for storing a plurality of codes from said coder;

means to connect said buffer register to the digital transmitter; and a feedback path connecting said buffer and said scanner and including means responsive to a particular extent of fill of said buffer to control said scanner.

9. The system of claim 8 wherein the particular extent of fill of said buffer is the median fill.

10. The system of claim 9 wherein said control means causes a scan by said scanner for fills of said buffer less than the median.

References Cited

UNITED STATES PATENTS

| | | | |
|---|---|---|---|
| 2,963,551 | 12/1960 | Schreiber et al. | 178—6 |
| 2,978,535 | 4/1961 | Brown | 178—6 |
| 3,324,237 | 6/1967 | Cherry et al. | 178—6 |

JOHN W. CALDWELL, *Acting Primary Examiner.*

R. L. RICHARDSON, *Assistant Examiner.*